W. BLAIR.
VARIABLE GEAR FOR MOTOR VEHICLES AND THE LIKE.
APPLICATION FILED FEB. 28, 1920.
1,390,426.
Patented Sept. 13, 1921.
2 SHEETS—SHEET 1.
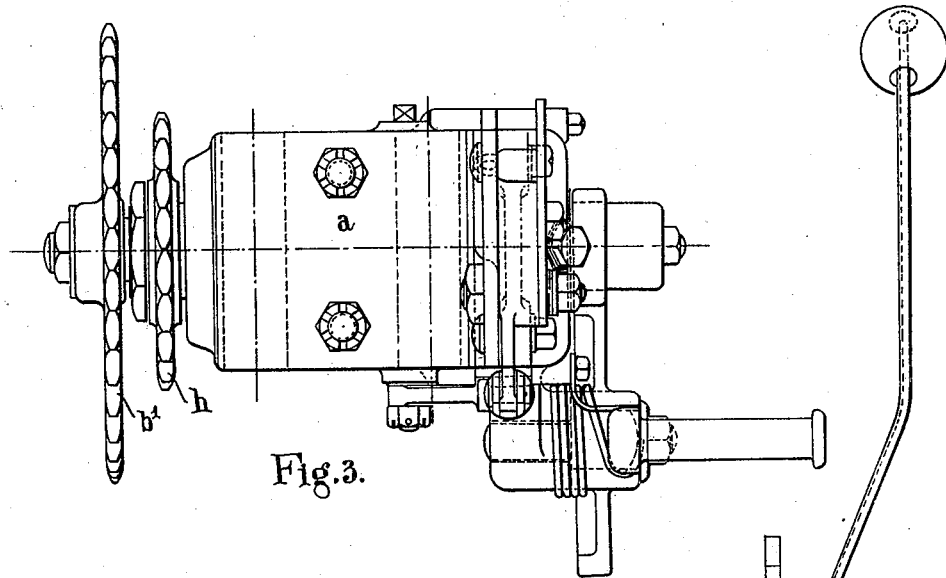
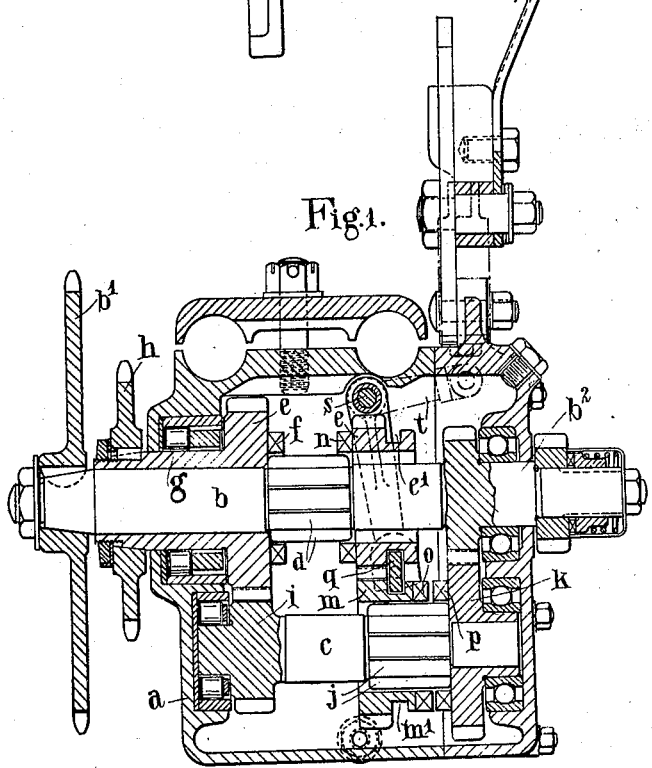
Inventor
W. Blair
By H. R. Kerslake
Atty.

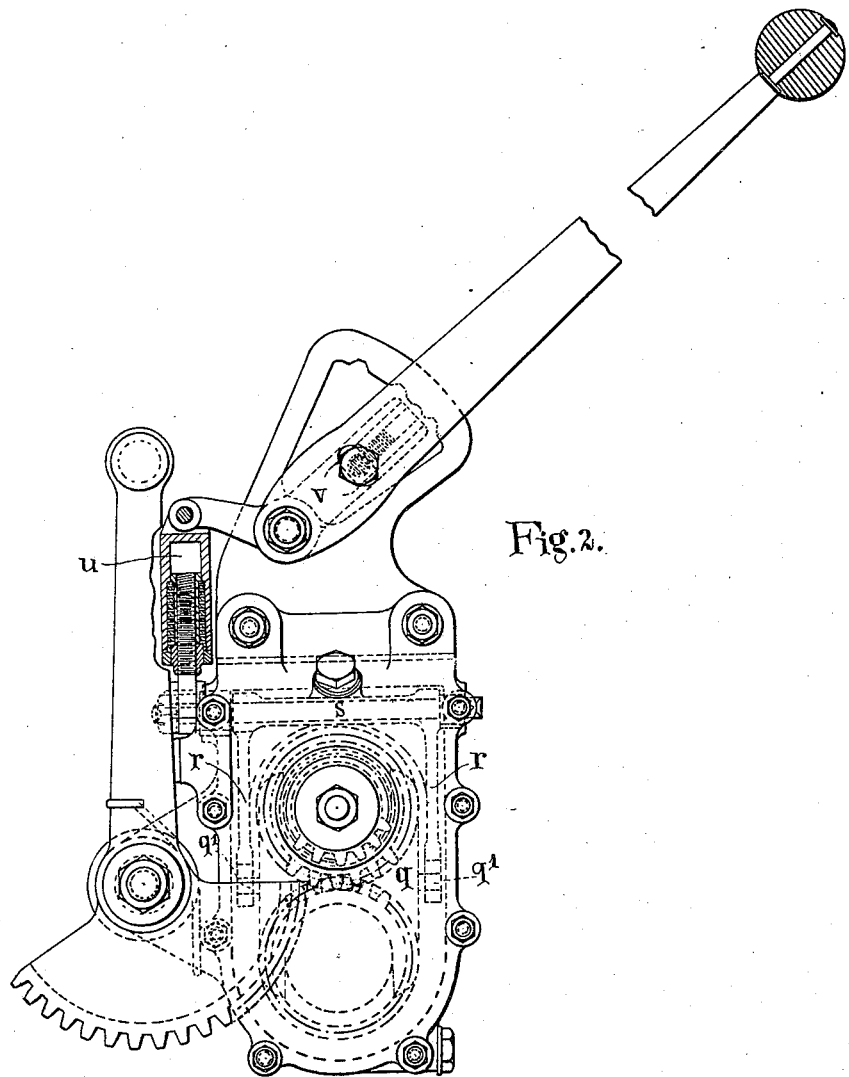

UNITED STATES PATENT OFFICE.

WILLIAM BLAIR, OF COVENTRY, ENGLAND, ASSIGNOR TO RUDGE-WHITWORTH, LIMITED, OF CROW LANE, COVENTRY, ENGLAND.

VARIABLE GEAR FOR MOTOR-VEHICLES AND THE LIKE.

1,390,426.  Specification of Letters Patent.  Patented Sept. 13, 1921.

Application filed February 28, 1920. Serial No. 362,151.

*To all whom it may concern:*

Be it known that I, WILLIAM BLAIR, a subject of the King of Great Britain and Ireland, and residing at Rudge Works, Crow Lane, Coventry, in the county of Warwick, England, have invented certain new and useful Improvements in Variable Gears for Motor-Vehicles and the like, of which the following is a specification.

This invention relates to variable ratio power transmission gears of the type embodying two parallel shafts with a pinion at each end of one shaft meshing with appropriate pinions on the other shaft, and a pair of intermediate pinions mounted one on each shaft and arranged to slide while still in mesh along the shafts for the purpose of changing the gear ratio.

The object of this invention is to provide an improved variable gear of the above described type.

The invention consists in a variable ratio power transmission gear having a pair of meshing pinions at one end of two parallel shafts, another pair also in mesh at the other end, and an intermediate pair by the longitudinal movement of which, while still in mesh, various gear ratio changes are effected, in which each shaft carries a permanently connected pinion at one end and a free pinion that may alternatively be coupled thereto or rotate thereon at the other end.

The invention further consists in improvements in variable gears of the above mentioned type, comprising a pinion fixed at one end of a lay shaft meshing with a pinion rotatable upon a main shaft; a pinion rotatable upon the other end of the lay shaft meshing with a fixed pinion upon the main shaft, and a pair of pinions always in mesh, one on each shaft, and slidable in conjunction thereon, said pair of pinions being so provided with clutches or dogs that in one position one will be clutched to the main shaft and to the rotatable pinions thereon, while the other is free to rotate upon the lay shaft; in a second position, both will be clutched to their respective shafts, and in a third position, one will be clutched to the lay shaft and to the pinion rotatable thereon, while the other is free to rotate upon the main shaft.

The invention further consists in improvements in variable gears as indicated in the preceding clause, in which a portion of both shafts is provided with splines adjacent to the pinions which are rotatable in relation to the shafts, said splines being so positioned that when the sliding pinions are moved from their first position to their second position, the pinion on the lay shaft which was free to rotate in the first position will engage with the splines thereon, while the pinion on the main shaft will still be engaging with its splines, and when the sliding pinions are moved to their third position, the pinion on the lay shaft will still engage with the splines, while the pinion on the main shaft will be disengaged, and free to rotate upon its shaft.

Referring now to the accompanying drawings:—

Figure 1 is a sectional view taken through a variable ratio power transmission gear in accordance with this invention.

Fig. 2 is an end elevation, and

Fig. 3 a plan of the gear shown in Fig. 1.

In carrying the invention into effect in the form shown by way of example in the drawings, a gear box $a$, which may be attached to a motor cycle or the like in any convenient manner, is provided with two parallel shafts $b$ and $c$.

The shaft $b$ carries at one extremity projecting outside the gear box a sprocket $b'$ by which power is transmitted thereto, and within the gear box adjacent to the opposite end is a pinion $b^2$ formed integral with or rigidly attached to the shaft. The shaft is also provided with splines $d$ for a purpose hereinafter described.

Rotatably mounted upon the shaft $b$ is a pinion $e$ provided with dogs or clutch teeth $f$ and having a sleeve $g$ projecting to the exterior of the box where it is provided with a driving sprocket $h$. The shaft may be mounted in the box upon anti-friction bearings of any known type as shown.

The shaft $c$, the axis of which is parallel to the axis of the shaft $b$, is also mounted in the box upon suitable anti-friction bearings and is provided at one end with a pinion $i$ meshing with the pinion $e$ and formed integral with or rigidly connected to the shaft. This shaft is also provided with splines $j$ and carries at the opposite end to the pinion $i$ a pinion $k$ rotatably mounted thereon and meshing with the pinion $b^2$. The pinion $k$ is provided with dogs or clutch teeth $p$.

The two shafts are provided between the pinions at their opposite ends with a pair of intermediate meshing pinions $e, m$, having key-ways therein for accommodating the splines $d$ and $j$ and each being provided with dogs or clutch teeth $n$ and $o$ for engaging the teeth $f$ and $p$ of the freely mounted pinions $e$ and $k$ respectively. The intermediate pinions $l$ and $m$ have upon their bosses grooves $e'$ $m'$ which are engaged by a double forked plate $q$ having trunnions $q'$ upon each side which are actuated by the arms $r$ of a bearing lever $s$ projecting through the side of the casing and provided with an arm $t$ actuated through the spring connection link $u$ by the controlling or hand lever $v$.

The pinions $l$ and $m$ are moved while still in mesh longitudinally upon the shafts $b$ and $c$, and when at the extreme left-hand end of their traverse the pinion $e$ forms by means of the dogs $f$ and $n$ a connection between the shaft $b$ and pinion $e$ so that a solid drive is transmitted through the gear. Upon being moved to the second position along the shaft the dogs $f$ and $n$ are disengaged, but the splines $d$ still engage the pinion $e$ while the splines $j$ engage the pinion $m$. In this second position a reduced gear ratio is obtained.

Upon further movement of the intermediate pinions $l$ and $m$ to the right, namely, into the position shown in Fig. 1, the splines $d$ are disengaged from the pinion $l$ and although the splines $j$ engage the pinion $m$ no drive is transmitted owing to the fact that the dogs $o$ and $p$ are not in engagement. In this third position, therefore, the gear transmits no drive and provides for a freely running engine. On moving the gear to the extreme right into the fourth position the dogs $o$ and $p$ are engaged, thus giving the third or lowest gear ratio.

In the construction shown the driving sprocket $h$ is positioned upon the same side of the gear box as the driven sprocket $b'$, but it will be readily understood that these sprockets may be upon opposite sides of the box if desired.

Other modifications may also be introduced without in any way departing from the spirit of the invention.

Having now described my invention, what I claim as new and desire to secure by Letters Patent is:—

1. A variable ratio power transmission gear comprising a main shaft, a lay shaft, a pinion fixed to one end of the lay shaft meshing with a pinion rotatable upon the main shaft; a pinion rotatable upon the other end of the lay shaft meshing with a fixed pinion upon the main shaft, a pair of pinions always in mesh, one on each shaft, means for sliding said pair of pinions always in unison on said shafts and engaging means upon said shafts, pair of pinions and rotatable pinions whereby the movement of said pair of pinions effects desired changes in the gear ratio.

2. A variable ratio power transmission gear comprising a main shaft, a lay shaft, a pinion fixed to one end of the lay shaft meshing with a pinion rotatable upon the main shaft; a pinion rotatable upon the other end of the lay shaft meshing with a fixed pinion upon the main shaft, a pair of pinions always in mesh, one on each shaft, means for sliding said pair of pinions always in unison on said shafts, engaging means whereby in one position of the pair of pinions one will be clutched to the main shaft and to the rotatable pinion thereon, while the other is free to rotate upon the lay shaft; in a second position both pinions of the pair will be clutched to their respective shafts, and in a third position one will be clutched to the lay shaft and to the pinion rotatable thereon, while the other is free to rotate upon the main shaft.

3. A variable ratio power transmission gear comprising a main shaft, a lay shaft, a pinion fixed to one end of the lay shaft meshing with a pinion rotatable upon the main shaft; a pinion rotatable upon the other end of the lay shaft meshing with a fixed pinion upon the main shaft, a pair of pinions always in mesh, one on each shaft, means for sliding said pair of pinions always in unison on said shafts, spline-ways in the bores of each of said pair of pinions and splines upon each of said shafts adjacent to the pinions which are rotatable thereon so positioned that when the sliding pinions are moved from their first position to their second position, the pinion on the lay shaft which was free to rotate in the first position will engage with the splines thereon, while the pinion on the main shaft will still be engaging with its splines, and when the sliding pinions are moved to their third position, the pinion on the lay shaft will still engage with the splines, while the pinion on the main shaft will be disengaged, and free to rotate upon its shaft.

4. A variable ratio power transmission gear comprising a main shaft, a lay shaft, a pinion fixed to one end of the lay shaft meshing with a pinion rotatable upon the main shaft and provided with clutch teeth; a pinion provided with clutch teeth rotatable upon the other end of the lay shaft meshing with a fixed pinion upon the main shaft, a pair of pinions always in mesh, one on each shaft, means for sliding said pair of pinions always in unison on said shafts, clutch teeth on the pinion slidable on the main shaft for meshing with the clutch teeth of the pinion rotatable at the end of the main shaft, clutch teeth on the pinion slidable on the lay shaft for meshing with the clutch teeth of the pinion rotatable at the end of the lay shaft and further engaging means upon said shafts and slidable pair of pinions so that in one position of the pair of pinions one will be clutched to the main shaft and to the rotatable pinion thereon, while the other is free to rotate upon the lay shaft; in a second position both pinions of the pair will be clutched to their respective shafts, and in a third position one will be clutched to the lay shaft and to the pinion rotatable thereon, while the other is free to rotate upon the main shaft.

5. A variable ratio power transmission gear comprising a main shaft, a lay shaft, a pinion fixed to one end of the lay shaft meshing with a pinion rotatable upon the main shaft; a pinion rotatable upon the other end of the lay shaft meshing with a fixed pinion upon the main shaft, a pair of pinions always in mesh, one on each shaft, means for sliding said pair of pinions always in unison on said shafts, engaging means whereby in one position of the pair of pinions one will be clutched to the main shaft and to the rotatable pinion thereon, while the other is free to rotate upon the lay shaft; in a second position both pinions of the pair will be clutched to their respective shafts, in a third position one will be clutched to the lay shaft and to the pinion rotatable thereon, while the other is free to rotate upon the main shaft, and in a fourth position intermediate between said second and third positions one will be clutched to the lay shaft while the other is free to rotate upon the main shaft.

6. A variable ratio power transmission gear comprising a main shaft, a lay shaft, a pinion fixed to one end of the lay shaft meshing with a pinion rotatable upon the main shaft and provided with clutch teeth; a pinion provided with clutch teeth rotatable upon the other end of the lay shaft meshing with a fixed pinion upon the main shaft, a pair of pinions always in mesh, one on each shaft, means for sliding said pair of pinions always in unison on said shafts, clutch teeth on the pinion slidable on the main shaft for meshing with the clutch teeth of the pinion rotatable at the end of the main shaft, clutch teeth on the pinion slidable on the lay shaft for meshing with the clutch teeth of the pinion rotatable at the end of the lay shaft, splines on said main and lay shafts for a portion of their lengths adjacent to the freely rotatable pinions, so that in one position the sliding pinion on the main shaft will be clutched thereto by means of said splines and will also engage by means of clutch teeth the rotatable pinion on the main shaft, while the sliding pinion on the lay shaft is free to rotate thereon, in a second position both sliding pinions will be clutched by means of said splines to their respective shafts, in a third position the sliding pinion on the lay shaft will be clutched thereto by means of splines and will also engage by means of clutch teeth the rotatable pinion on the lay shaft, while the sliding pinion on the main shaft is free to rotate thereon; and in a fourth position which is intermediate between said second and third positions the sliding pinion on the lay shaft will be engaged by means of splines, while the sliding pinion on the main shaft is free to rotate thereon, so that a freely running engine is obtained.

In testimony whereof I have signed my name to this specification.

WILLIAM BLAIR.